United States Patent [19]

Bauer et al.

[11] Patent Number: 4,494,930
[45] Date of Patent: Jan. 22, 1985

[54] SHAFT FURNACE FOR HEAT TREATMENT OF FINELY DISPERSED MATERIALS

[75] Inventors: Ivan K. Bauer; Vitaly P. Malyshev; Dzhantore N. Abishev; Sergei V. Belyaev; Anatoly I. Shirokov; Nazymkul Baltynova; Elena S. Alipchenko, all of Karaganda; Djusenkhan D. Ekeibaev; Vakhit T. Abdulkhairov, both of Dzhezkazganskaya, all of U.S.S.R.

[73] Assignee: Khimiko-Metallurgichesky Institut, Karaganda, U.S.S.R.

[21] Appl. No.: 403,647

[22] PCT Filed: Nov. 28, 1980

[86] PCT No.: PCT/SU80/00185
§ 371 Date: Jul. 16, 1982
§ 102(e) Date: Jul. 16, 1982

[87] PCT Pub. No.: WO82/01936
PCT Pub. Date: Jun. 10, 1982

[51] Int. Cl.³ .................... F27B 15/10; F27D 1/08
[52] U.S. Cl. ............................ 432/95; 34/174; 34/168; 432/96; 432/102
[58] Field of Search ............ 432/95, 96, 97, 100, 432/102; 34/174, 168

[56] References Cited

U.S. PATENT DOCUMENTS

| 539,769 | 5/1895 | Garvin | 432/95 |
|---|---|---|---|
| 1,554,854 | 9/1925 | Hubmann | 34/174 |
| 2,671,057 | 3/1954 | McClure | 34/174 |
| 2,685,343 | 8/1954 | Permann | 34/174 |
| 2,835,051 | 5/1958 | Rydin | 34/174 |
| 2,857,155 | 10/1958 | Dickey | 432/102 |
| 3,889,393 | 6/1975 | Thomas et al. | 432/97 |
| 4,008,994 | 2/1977 | Numasaki et al. | 432/102 |
| 4,242,806 | 1/1981 | McClaren | 34/174 |
| 4,289,481 | 9/1981 | Yano | 432/97 |
| 4,351,119 | 9/1982 | Mennier | 432/96 |

FOREIGN PATENT DOCUMENTS

| 31-2803 | 4/1956 | Japan . | |
| 165816 | 12/1981 | Japan | 110/245 |
| 194648 | 3/1967 | U.S.S.R. . | |
| 415464 | 7/1974 | U.S.S.R. . | |
| 765619 | 9/1980 | U.S.S.R. . | |
| 779773 | 11/1980 | U.S.S.R. . | |
| 953395 | 8/1982 | U.S.S.R. . | |

Primary Examiner—Henry C. Yuen
Attorney, Agent, or Firm—Lilling & Greenspan

[57] ABSTRACT

A shaft furnace for heat treatment of finely dispersed material has a casing of rectangular cross section with a hopper built into a cover thereof. The top of the casing accommodates pipes for drawing off resultant gases. The casing also houses two groups of plates equidistant from the vertical axis of the casing and having different lengths increasing in the direction from the vertical axis toward a narrow wall of the casing so as to form therebetween and the narrow wall of the casing passages for the flow of gases toward the pipes for exhausting resultant gases.

3 Claims, 5 Drawing Figures

SHAFT FURNACE FOR HEAT TREATMENT OF FINELY DISPERSED MATERIALS

FIELD OF THE INVENTION

The invention relates to metallurgical and chemical technology and, in particular, to shaft furnaces for heat treatment of finely dispersed materials.

DESCRIPTION OF THE PRIOR ART

Currently, powder-like materials are treated mostly in multiple-hearth mechanically rabbled furnaces. These furnaces have several annular hearths placed one above another and enclosed in a metallic cylindrical casing lined on the inside with a refractory material. The material is moved from one hearth to another by rabbles attached to a central cooled driving shaft. Modern furnaces have up to 16 hearths. The furnaces are heated by combustion gases and burners provided additionally on some hearths. Gases are drawn off through a gas outlet in the top part of the furnace.

This type of furnace is employed for drying and calcining limestone, limestone slimes, and magnesite, and for oxidizing roasting of sulfide materials. The furnace is bulky, and mechanical rabblers inside the furnace complicate its construction and sealing, which renders a multiple-hearth mechanically rabbled furnace practically unsuitable for heat-treatment of powdery and pasty materials without access of air.

Rotary kilns are widely employed for calcining or roasting pasty materials. These kilns have a horizontally arranged metallic casing lined on the inside with a refractory material. The heating arrangements of the rotary kiln include a fire hood and a gas discharge end. Also provided are devices for supplying fuel and discharging calcined (roasted) material. Sealing devices at joints of rotating and stationary parts of the kilns greatly complicate the design thereof. These kilns are used for sintering pasty bauxite or nepheline materials and for oxidizing roasting of sulfide materials. No effective sealing of rotary kilns is practically possible, so that they are not employed for thermal treatment without access of air of powdery or pasty materials.

In addition, treatment of powdery materials in rotary kilns and multiple-hearth furnaces involves substantial dusting, which adversely affects the good repair and service life of units and component parts of the kilns and furnaces.

Materials can also be heat-treated in a protective atmosphere in electrical resistor-drum-type rotary kilns which are intended for treating non-caking and non-sticking loose materials.

These kilns are suited for heat-treatment of materials that give off little dust, as then only it proves advantageous to circulate the costly inert gas.

However, electrical resistor-type rotary kilns cannot be used for thermal processing of flotation concentrates which are fine dusting materials. Another obstacle for treating flotation concentrates is the attendant evolution of moisture, of products from the pyrolysis of flotation reagents and of sulfur.

Finely dispersed dusting materials can also be treated thermally in fluidized bed furnaces. These furnaces comprise a bottom through which hot air is supplied under pressure to fluidize the material being treated. An important component part of the furnace is the bottom which is a slab of refractory concrete with many orifices that are protected against ingress of the material by "mushroom"-shaped nozzles. The treated material is discharged from the furnace by gravity through devices situated level with the fluidized bed.

These furnaces are employed for oxidizing, reducing, sulfidizing, chloridizing and other kinds of roasting of various concentrates and ores, for drying granula, pasty, and liquid materials.

However, these furnaces suffer from a considerable entrainment of dust, the amount of which may attain 50% of the charge fed to the furnace. This complicates and raises the cost of a dust cleaning system for collecting entrained particles. The recovered material requires re-roasting in muffle furnaces and a subsequent individual treatment for extraction of valuable components therefrom.

The devices for collecting entrained particles substantially complicate furnace design and raise the cost of furnace operation. To obviate this disadvantage, the powdery material is pelletized and subjected to a thermal treatment in a shaft furnace.

There is widely known a shaft furnace for thermal treatment of pelletized materials in a stream of hot gas (see, for example Japanese Pat. No. 2807, cl. 10A51, published in 1964). This furnace consists of vertically arranged sections, each of which is provided with pipes for supplying of hot gas and pipes for exhausting of gaseous and vapour substances. The shaft of the furnace expands towards the bottom. An essential precondition of trouble-free operation of the furnace is the charging of pelletized raw materials. This ensures the flow of the heating agent through the bed of the material and the continuous descent of the charge in the shaft by gravity. Should a powdery or a pasty material be charged, the heating agent can no longer filter through the bed. The material will then stick to furnace walls and so block ducts for gas flow.

There is also known a plant for thermal treatment of loose materials (see, e.g. USSR Inventor's Certificate No. 194,648, cl. F 26B 17/16, published on Mar. 30, 1967), which comprises a vertical casing with heat exchange heating and cooling surfaces situated vertically and symmetrically relative to the vertical axis of the casing. The heat exchange surfaces are formed with bundles of horizontal tubes connected to collector boxes. In the heating zone, the tubes are heated by combustion gases. In the tubes of the cooling zone circulate water. The casing of the plant and the tubes are oscillated by a vibrator. The casing is provided on the inside in the material heating zone with louvered grates to ensure a uniform removal of vapours. The louvered grates are formed with two groups of plates equidistant from the vertical axis of the casing. The clear cross section of these plates is suited to the variation in the moisture content and the parameters of the thermal treatment.

The material is supplied from the top through a charging hopper mounted atop the casing. The material descends by gravity and under the action of vibratory forces contacting the external surfaces of pipes. This heats the material, and vaporizes the moisture contained therein. The vapour is directed toward the walls of the casing, and flows through the louvered grates into the vapour conduits which exhaust it to the atmosphere. The dried material passes through the cooling zone and is discharged by a feeder.

An essential precondition for a trouble-free performance of this device is the provision of a vibrator and of vibrating heat exchange surfaces placed inside the bed of the material. This impairs the reliability of the furnace, complicates its operation and repair. The material which is pasty, is liable to stick to the heat exchange surfaces placed inside the furnace. This destabilizes the thermal conditions inside the furnace, and, therefore, affects the quality of finished product.

It should be noted that ores extracted at present are characterized by an increase in the proportion of lean polymetallic ores which require beneficiation. The resultant concentrates are pasty and moist powdery materials, the further treatment of which necessarily involves their thermal processing (drying, roasting, calcining).

However, known furnaces fail to provide efficient thermal treatment without access of air of these finely dispersed materials, and this has given rise to a need for substantially improving the designs of known furnaces or developing new types of furnaces for the purpose.

Serious problems are encountered in the processing of an ever increasing amount of pasty and moist powdery materials, the thermal treatment of which requires additional investments for collecting dust, for moving the material inside a furnace, for rotating a kiln or for pelletizing these finely dispersed materials.

What is desired is a shaft furnace for heat treatment of finely dispersed materials, so designed as to enhance the reliability and simplify the design thereof and improve the quality of product being treated without access of air.

SUMMARY OF THE INVENTION

The invention provides a shaft furnace for heat treatment of finely dispersed materials, comprising a heated casing of rectangular cross section, atop which is mounted a charging hopper, pipes for exhausting process gases being situated in the top part of the casing with two groups of plates equidistant from the vertical axis of the casing being arranged inside the internal cavity thereof. According to the invention, the plates are in parallel space relationship with the vertical axis of the casing, have different lengths increasing in the direction from the vertical axis toward the narrower wall and forming passages therebetween and the narrow wall of the casing, so as to channel process gases toward the exhaust pipes.

To make the passages for the flow of gases extend longer toward the exhaust pipes for drawing off process gases and thus to enhance the removal of gases from a treated material prior to their discharge from the furnace, the bottom ends of the plates situated near the periphery of the casing are bent in the direction of the vertical axis of the casing at an angle of 10° to 50° relative to the vertical part thereof.

To make the furnace more compact, the bottom part of the narrow walls thereof is preferably bent inwards toward the vertical axis of the casing, and in parallel space relationship with the bent ends of the plates.

To avoid the hanging of materials and to ensure normal thermal conditions inside the furnace, it is advisable to have the width of the wide walls equal 8 to 10 times that of the narrow walls of the furnace.

Such furnace construction makes it possible to subject to thermal treatment, effected without access of air and without a protective atmosphere, non-pelletized powdery or pasty materials, to improve operating reliability of the furnace and to ensure higher quality of the product being treated. The provision of different-in-length plates, arranged inside the furnace in parallel relationship with one another and with the vertical axis of the casing, is intended as a means to control the amount of material entering the furnace, which is governed by the distance between the two plates nearest the vertical axis of the casing, and to ensure an unimpeded flow of the treated material from the point of charging to the point of discharge of the product.

With this arrangement of the plates, passages are formed between the plates and the narrow wall of the casing, which promote selective removal of vapour and gaseous substances given off during the processing of material. Different vapours and gases pass through different passages toward the exhaust pipes.

BRIEF DESCRIPTION OF THE DRAWINGS

The invention will now be described, by way of example only, with reference to the accompanying drawings, in which.

DETAILED DESCRIPTION OF THE INVENTION

Figure 1:
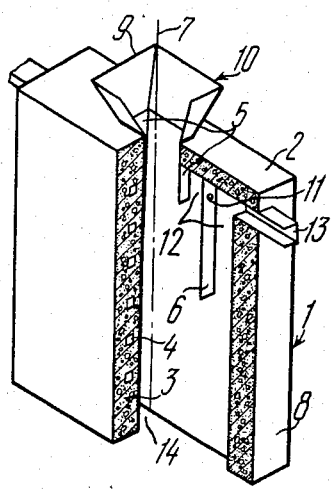
FIG. 1 is an isometric projection, partly broken away, of a shaft furnace for heat treatment of finely dispersed materials with two pairs of plates, according to the invention.

Referring now to the above drawings and to FIG. 1 in particular, there is shown therein a furnace for heat treatment of finely dispersed materials, which comprises a casing 1 (FIG. 1) of rectangular cross section and a detachable top cover 2 formed with a refractory concrete 20 to 30 mm thick. Wide walls 3 of the casing 1 are provided with grooves 4 which accommodate resistor heaters (omitted on the drawing). Two groups of plates 5 and 6 parallel to a vertical axis 7 and equidistant from this axis 7 are situated transversally in the top part of the internal space of the casing 1 between the heated wide walls 3. The number of the plates 5 and 6 in each of the groups depends on the properties of the material being treated and the thermal processing (drying, roasting, calcining) conditions.

The plates 5 and 6 have different lengths increasing in the direction from the vertical axis 7 to the narrow wall 8 of the casing 1. The two short plates 5 nearest the vertical axis 7 are rigidly secured to narrow walls 9 of a hopper 10 for charging materials, which is sealed into the cover 2. The remaining plates 6 are detachable, secured to the cover 2 and have holes 11 in the top part. The plates 5 and 6, and the narrow wall 8 of the casing 1 form passages 12 for the flow of vapour and gaseous substances toward exhaust pipes 13, which are provided in the narrow wall 8 of the casing 1. The bottom ends of the narrow walls 8 and the wide walls 3 form a discharge port 14 of the furnace.

The ratio of the width of the narrow wall 8 to the width of the wide wall 3 of the casing 1 approximates 1:8 to 10, so as to keep the width of the furnace within optimum limits. An increase in this ratio reduces the furnace width, and impedes the descent of the material inside the casing 1, which then tends to hang and overheat. A decrease in the value of the above ratio results in a deterioration of the thermal conditions inside the furnace.

Figure 2A:
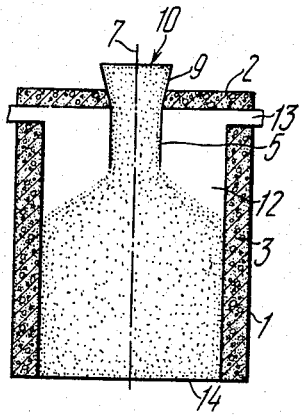
FIGS. 2a and 2b are vertical sectional views through the vertical axis from the front and side, respectively, of a shaft furnace for heat treatment of finely dispersed materials with one pair of plates, according to the invention.
Figure 2B:
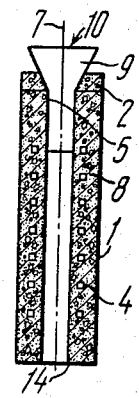

A furnace for heat treatment of finely dispersed material may be designed with a single plate 5 (FIGS. 2a and 2b) in each of the groups. These plates 5 are rigidly secured to the narrow walls 9 of the charging hopper 10 and are situated parallel to the vertical axis 7 inside the casing 1. The narrow walls 8 of the casing 1 actually serve as the second long plates. The space 12 between the plates 5 and the narrow wall 8 of the casing 1, which is free of a material being treated, is the passage 12 through which flow the vapour and gasous substances evolving from the material being treated toward exhaust pipes 13.

Figure 3A:
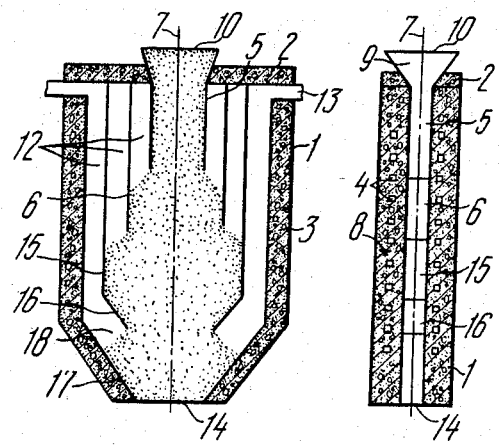
FIGS. 3a and 3b are vertical sectional views through the vertical axis from the front and side, respectively, of a shaft furnace for heat treatment of finely dispersed materials with groups of plates and a narrowed bottom part of the casing, according to the invention.
Figure 3B:
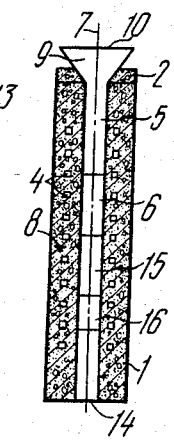

A furnace according to the invention may contain three plates 5, 6 and 15 (FIGS. 3a and 3b).

This embodiment of a furnace for heat treatment of finely dispersed material enhances the removal of gaseous substances from the material being treated. In this case, bottom ends 16 of the extreme plates 15, situated on the periphery near the narrow wall 8 of the casing 1, are bent at an angle of 10° to 50° relative to the vertical axis 7 of the casing 1. Bottom ends 17 of the narrow walls 8 of the casing 1 are bent through a same angle. This results in additional passages 18 for the flow of gaseous substances toward the exhaust pipes 13 between the extreme plates 15 and the narrow wall 8 of the casing 1, through which is exhausted the remainder of vapour or gaseous substances given off by a material being treated prior to the discharge thereof through the port 14 of the furnace.

A slope of less than 10° of the plates 15 and the narrow walls 8 results in a greater height of the furnace and makes it bulkier, whereas a slope in excess of 50° leads to an accumulation of a material being treated at the bends of the plates 15 and so hinders the discharge thereof.

A furnace for heat treatment of finely dispersed material operates in the manner below.

A finely dispersed material is fed from the charging hopper 10 (FIG. 1), sealed into the detachable cover 2, inside the space formed by the short plates 5 nearest the vertical axis 7 of the casing 1 and descends by gravity. The material then enters the space formed with the next pair of the plates 6 and fills this space. Next, the material moves toward the narrow wall 8 of the casing 1 and fills only the bottom part of the casing 1, descending in the process toward the discharge port 14 of the furnace.

The temperature of the heated walls is maintained at a level higher than the boiling point of a vapour or a gaseous substance given off by a material being treated. The temperature is controlled through the agency of resistor heaters (omitted on the drawing) set in the grooves 4 of the wall 3 of the casing 1. The vapour and the gaseous substances evolving from the heated material build a pressure along the walls 3 and 8 of the casing 1 and the plates 5 and 6. This prevents the material from sticking to the walls 3 and 8 and to the plates 5 and 6 and facilitates the descent thereof by gravity toward the discharge port 14 of the furnace.

The vapour and the gaseous substances given off by the material being treated rise through the passages 12 into the top part of the casing 1, pass through the holes 11 of the plates 6 toward the pipes 13 and are exhausted under pressure into a condenser or to the atmosphere.

The pressure built up by the vapour and the gaseous substances from below and the column of the material being treated, which fills the casing 1 from the hopper 10 to the discharge port 14, prevents an ingress of air into the furnace during its operation.

If a furnace for heat treatment of a finely dispersed material is built as shown on FIG. 2, the material being treated, once it fills the space between the plates 5, enters directly the casing 1 of the furnace. The height to which the casing 1 is filled or the width of the passage 12 formed with the plates 5 and the narrow wall 8 depend on the physical properties (moisture content, fineness, angle of repose) of the material being treated and on drying parameters.

This furnace is simple in manufacture and operation and is employed for thermally processing materials of high moisture contents, such as pastes and suspensions.

In a furnace for heat treatment of finely dispersed material with three plates in each group, once a material being treated fills the space enclosed by the extreme plates 15 (FIG. 3), it enters the space formed with the bottom ends 16 of the plates 15. Next, the material fills the bottom part of the casing 1 formed with the bottom part 17 of the narrow walls 8 of the casing 1, bent at an angle of 10° to 50° relative to the vertical axis 7, and descends toward the discharge port 14 of the furnace. In the process, an additional amount of the remaining gaseous substances is removed from the material being discharged, thus improving the quality thereof.

A furnace for heat treatment of finely dispersed material has been tested industrially for treating molybdenum and tungsten products.

The drying of pasty molybdenum semiproducts of a total content of moisture and of flotation oils of 30% in a furnace with a single pair of plates at a temperature of the wide walls of 450° C. yielded a finished product with a total content of moisture and of flotation oils of 5%.

A powdery tungsten concentrate with 7.09% sulfur in the form of pyrite was subjected to a thermal treatment at the temperature of 800° C. to remove pyrite sulfur in a furnace containing a group of plates, wherein the narrow walls of the furnace casing, the ends of the plates and the bottom part of the casing walls were bent relative to the vertical. As the roasted concentrate contained 0.65% sulfur, this represented a substantial improvement of the quality thereof.

The industrial tests of a shaft furnace for heat treatment of finely dispersed materials have indicated its wide range of applicability, as the furnace can handle materials of different size, ranging in composition from granular masses to pastes. The furnace is characterized by a high specific throughput capacity, a lesser consumption of electric power as compared to other furnaces for similar application, a considerably improved quality of finished product, an amenability to mechanization and automation of operations which a thermal treatment of a material involves, a simplicity of both manufacture and operation of the furnace.

COMMERCIAL APPLICABILITY

The invention can be effectively used for drying and calcining without access of air of powdery or pasty materials, such as flotation concentrates and slimes, and for driving off volatile and readily decomposing suubstances, such as mercury, sulfur and flotation reagents, in the metallurgical and chemical industries.

What is claimed is:

1. A shaft furnace for heat treatment of finely dispersed materials, comprising a heated casing of rectangular cross section; a cover detachably connected to said casing; a hopper communicating with said cover for charging a material in to said casing; exhaust pipes situated in a top part of the casing and through which resulting gases are drawn off; and two groups of plates located in said casing equidistant from a vertical axis of said casing, wherein the plates being arranged parallel to the vertical axis of the casing being of different lengths which increase in the direction from the vertical axis toward a narrow wall of said casing, and form passages therebetween and the narrow wall for the flow of gases toward said exhaust pipes; and, wherein the widths of the narrow walls is smaller than the widths of the wide walls of the casing by a factor of 8 to 10.

2. A shaft furnace for heat treatment of finely dispersed materials as claimed in claim 1, wherein bottom ends of the plates situated near the periphery of the casing are bent toward the vertical axis at an angle of 10° to 50° to the vertical axis.

3. A shaft furnace for heat treatment of finely dispersed materials as claimed in claim 2, wherein a bottom part of the narrow walls of the casing is bent toward the vertical axis and is parallel to the bent bottom ends of the plates.

* * * * *